(12) United States Patent
Yi et al.

(10) Patent No.: US 8,630,619 B2
(45) Date of Patent: Jan. 14, 2014

(54) METHOD OF COMMUNICATING BETWEEN A VEHICLE AND A TELEMATICS SUBSCRIPTION SERVICE

(75) Inventors: Ki Hak Yi, Windsor (CA); Kenneth L. Peirce, Grosse Pointe Farms, MI (US); Curtis L. Hay, Clarkston, MI (US); Andrew J. Macdonald, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/475,362

(22) Filed: May 18, 2012
(Under 37 CFR 1.47)

(65) Prior Publication Data
US 2013/0310010 A1 Nov. 21, 2013

(51) Int. Cl.
*H04M 3/16* (2006.01)

(52) U.S. Cl.
USPC .......................................... 455/410; 455/411

(58) Field of Classification Search
USPC .................................................. 455/411, 410
See application file for complete search history.

(56) References Cited

U.S. PATENT DOCUMENTS

| | | | | |
|---|---|---|---|---|
| 2002/0140545 | A1* | 10/2002 | Nietupski et al. | 340/5.72 |
| 2009/0285377 | A1* | 11/2009 | Sennett et al. | 379/201.04 |
| 2011/0239285 | A1* | 9/2011 | Shi et al. | 726/7 |

* cited by examiner

*Primary Examiner* — Temica M Beamer
*Assistant Examiner* — Joel Ajayi
(74) *Attorney, Agent, or Firm* — Anthony L. Simon; Reising Ethington P.C.

(57) ABSTRACT

A method of communicating between a vehicle and a telematics subscription service includes initiating a call from a vehicle telematics unit to a telematics subscription service via a wireless carrier system; accessing a vertical service code telephone number that is associated with the telematics subscription service and stored at a vehicle carrying the vehicle telematics unit; establishing a call between the vehicle telematics unit and the telematics subscription service using the accessed vertical service code telephone number; and wirelessly transmitting vehicle-related data between the vehicle telematics unit and the telematics subscription service over the established call.

21 Claims, 4 Drawing Sheets

METHOD OF COMMUNICATING BETWEEN A VEHICLE AND A TELEMATICS SUBSCRIPTION SERVICE

TECHNICAL FIELD

The present invention relates generally to wireless communications and more specifically to wireless communications between a vehicle and a telematics subscription service.

BACKGROUND

Vehicles are frequently equipped with vehicle telematics units that are capable of wirelessly communicating both voice and data between vehicles and central facilities. The central facilities may receive communications from vehicles via one or more monitored telephone numbers. When a vehicle attempts to communicate with a central facility, it dials a particular telephone number and a wireless carrier system can connect the vehicle with the central facility. Besides vehicle communications, the central facility may also be contacted by a number of other sources dialing the monitored telephone numbers. As a result, it can be challenging for the central facility to identify and service calls from vehicles while ignoring and/or preventing calls from other sources.

SUMMARY

According to an aspect of the invention, there is provided a method of communicating between a vehicle and a telematics subscription service. The method includes initiating a call from a vehicle telematics unit to a telematics subscription service via a wireless carrier system; accessing a vertical service code that is associated with the telematics subscription service and stored at a vehicle carrying the vehicle telematics unit; establishing a call between the vehicle telematics unit and the telematics subscription service using the accessed vertical service code; and wirelessly transmitting vehicle-related data between the vehicle telematics unit and the telematics subscription service over the established call.

According to another aspect of the invention, there is provided a method of communicating between a vehicle and a telematics subscription service. The method includes providing a call center, associated with a telematics subscription service, that is capable of receiving wireless communications from a plurality of vehicles via a wireless carrier system; establishing a vertical service code that is used by the wireless carrier system for receiving wireless communications from the plurality of vehicles; receiving a call that is placed using the vertical service code from one or more vehicles via the wireless carrier system; identifying the received call using a temporary reference number randomly-generated by the wireless carrier system; and wirelessly communicating with one or more vehicles by sending vehicle-related data from the telematics subscription service or by receiving vehicle-related data at the telematics subscription service over the received call using the temporary reference number.

According to yet another aspect of the invention, there is provided a method of communicating between a vehicle and a telematics subscription service. The method includes initiating a call from a vehicle telematics unit to a telematics subscription service using a vertical service code; determining the destination of the initiated call at a wireless carrier system based on the vertical service code; assigning a temporary reference number to the initiated call at the wireless carrier system; sending the temporary reference number to a call center in communication with the telematics subscription service; establishing the call from the vehicle telematics unit to the call center based on the temporary reference number; and communicating vehicle data between the vehicle telematics unit and the call center using the established call.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

The method described below minimizes the amount of telephony infrastructure handling incoming calls to central facilities and selectively permits calls to the central facilities. The method can carry this out using feature code calling between a vehicle and a central facility associated with the telematics subscriber service. Feature code calling generally involves a particular string of digits recognized by the wireless carrier system, the land network, or other similar telephony infrastructure, which carries with it an instruction to direct communications placed using the particular string of digits to a common destination. The mechanism used to carry out feature code calling is often a two or three digit code that is preceded by a "*" and can also be referred to as a "vertical service code" or simply a "star code." Mechanisms other than the "*" can be used to carry out feature code calling and for the following discussion the terms "feature code calling," "vertical service code," and "star code" may be used interchangeably.

Using the vertical service code to connect the vehicle with the central facility, the wireless carrier system can identify calls placed from the vehicle and route them directly to the central facility. Routing calls in this way can eliminate telephone numbers monitored by the central facility over which vehicles have traditionally contacted central facilities. As part of eliminating the telephone numbers, a portal through which undesirable callers can contact the central facility can also be eliminated.

Figure 1:
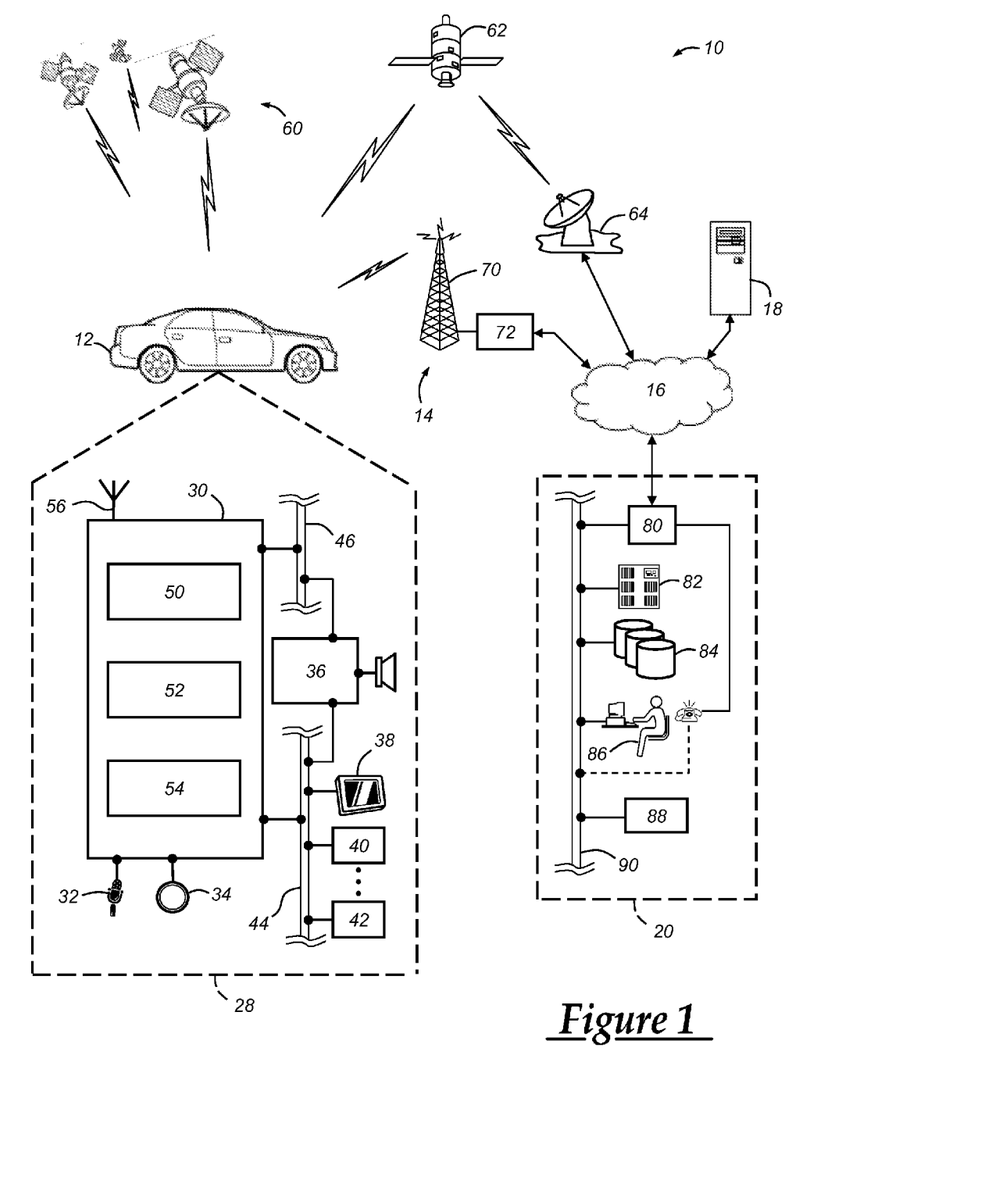
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. One or more of the above-mentioned services can be provided as part of a telematics subscription service in which subscription-based communications can be provided to a subscriber, such as a vehicle owner and/or operator. The telematics subscription service may also be associated with a call center, which will be discussed later in more detail. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
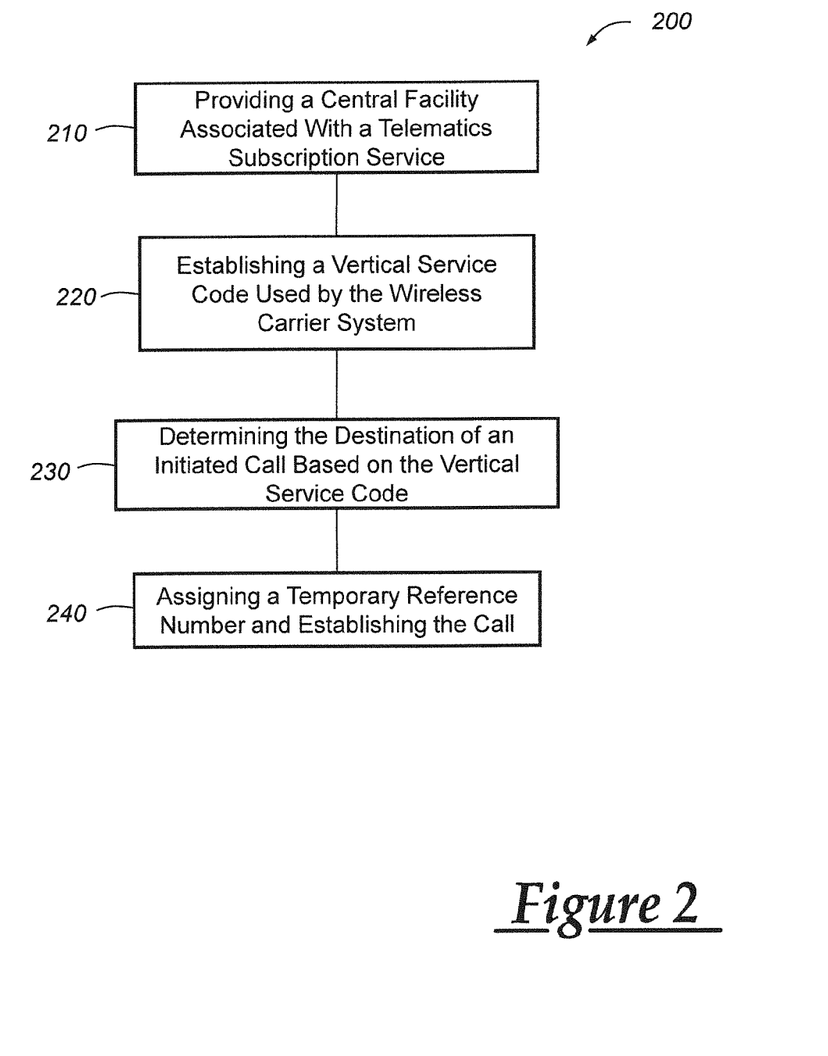
FIG. 2 is a flow chart depicting an exemplary embodiment of the method disclosed herein.

Turning now to FIG. 2, there is shown an embodiment of a method 200 of communicating between a vehicle and a telematics subscription service. The method 200 begins at step 210, which provides a central facility—associated with a telematics subscription service—that is capable of receiving wireless communications from a plurality of vehicles 12 via a wireless carrier system 14. An example of such a central facility is the call center 20. To carry out one or more of the services discussed above, the call center 20 may be associated with the telematics subscription service, which involves sending and receiving communications both to and from the vehicle 12. The method 200 proceeds to step 220.

At step 220, a vertical service code is established and used by the wireless carrier system 14 for receiving wireless communications from the plurality of vehicles 12. Vertical service codes can enable the wireless carrier system 14, land network 16, or other telephony infrastructure to carry out an action, such as call routing, without receiving a dialed telephone number from the vehicle telematics unit 30. Generally speaking, vertical service codes can be dialed by the vehicle telematics unit 30 and take the form of *XX or *2XX. While feature code calling may be implemented as codes preceded by a "*" there is no reason why the "*" could not be replaced by a "#" or other signaling convention. However, many wireless carrier systems 14 have adopted the use of the "*" as their convention.

It is possible that the vertical service code used with the method 200 described herein can be an inter-network vertical service code. Inter-network service codes can be coordinated with a plurality of wireless carrier systems 14, land networks 16, or other similar telephony infrastructure to ensure that each entity can understand and act on a particular vertical service code. This is helpful because vehicle telematics units 30 can travel great distances. And as a result, it is possible that the vehicle telematics unit 30 can communicate with the call center 20 using a wireless carrier system 14 that is not its home network. In those cases, vertical service codes that function on both home wireless carrier systems 14 as well as roaming wireless carrier systems 14 can provide seamless communication between the vehicle telematics unit 30 and call center 20 regardless of vehicle location. In this case, care may be taken to ensure that the inter-network vertical service code is recognized by two or more wireless carrier systems 14, land networks 16, or other telephony infrastructure and that each of these entities acts upon the vertical service code in a uniform way.

It is also possible that the vertical service code used with the method 200 can be an intra-network vertical service code. In this case, the intra-network vertical service code can be used only within a particular wireless carrier system 14. For instance, a wireless carrier system 14, such as Verizon Wireless, can assign an intra-network vertical service code to the call center 20. And the intra-network vertical service code would be recognized while the vehicle telematics unit 30 operated using base stations belonging to or recognized by Verizon Wireless, for example. Intra-network vertical service codes may be more easily established relative to inter-network vertical service codes because there is little to no chance that intra-network vertical service codes will interfere with codes established in wireless carrier systems other than Verizon Wireless. However, if the vehicle telematics unit 30 travelled away from Verizon Wireless base stations, then the intra-network vertical service code may not be able to connect the vehicle telematics unit 30 with the call center 20. The method 200 proceeds to step 230.

At step 230, a call is initiated from the vehicle telematics unit 30 to the telematics subscription service via the wireless carrier system 14 and a destination of the call is determined based on the vertical service code. The call can be placed using the vertical service code. After determining that the vehicle telematics unit 30 wishes to wirelessly communicate with the call center 20, the unit 30 can access the vertical service code for the call center 20. One or more vertical service codes can be stored at the vehicle 12 and a stored vertical service code can be associated with the call center 20. The vertical service code can follow the 2-3 digit convention or can be something else, such as a longer string of numerical digits and/or alphabet characters, such as "*ONSTAR." Using "*ONSTAR" as an example, the letters of this vertical service code can be translated to numerical digits using the letter mapping commonly found on standard telephone keypads.

In one example, a plurality of call centers 20 can each be associated with a single vertical service code and when the vehicle telematics unit 30 dials the vertical service code, the call can be directed to the call center 20 associated with the dialed vertical service code. In another example, the call can be initiated using a single vertical service code representing a plurality of call centers 20 and later directed to one of those call centers 20 based on different criteria. These criteria can include directing calls based on the location of the vehicle 12 or the type of communications to be exchanged between the vehicle 12 and the call center 20. These criteria can also include a need for specialized live advisors 86 that can be located at a particular call center 20. Specialized live advisors 86 can be used during vehicle diagnostic efforts in which one or more live advisors 86 may have specialized knowledge of a vehicle condition that has been identified. The method 200 proceeds to step 240.

At step 240, a temporary reference number is assigned to the call from the vehicle telematics unit 30 at the wireless carrier system 14. The temporary reference number can be randomly generated by the wireless carrier system 14 and assigned to the call by the system 14 during the process of establishing the call. For example, the wireless carrier system 14 can determine that vehicle telematics unit 30 is initiating a call using the vertical service code and using an ISDN user part (ISUP), the wireless carrier system 14 can assign a temporary reference number to the call. In one example, the temporary reference number can be the mobile identification number (MIN) or mobile dialed number (MDN). It is also possible to use an ISUP to assign a randomly generated number to act as a temporary reference number. In such an implementation, the wireless carrier system 14 can use a random number generator. When establishing a call between the vehicle telematics unit 30 and the call center 20, the wireless carrier system 14 can identify the call using the random or pseudo-random number generator that can create the temporary reference number for identifying the call. This random number generator can provide a heightened level of security to communications between the vehicle telematics unit 30 and the call center 20. The temporary reference number can then be sent to the call center 20 to establish the call between the vehicle telematics unit 30 and the call center 20. The call is established between the vehicle telematics unit 30 and the call center 20 based on the temporary reference number and vehicle data can be communicated between the vehicle telematics unit 30 and the call center over the established call. When the call is ultimately terminated, the wireless carrier system 14 can quarantine the temporary reference number created using the random number generator for a proscribed period of time, such as 48 hours. The method 200 then ends.

Figure 3:
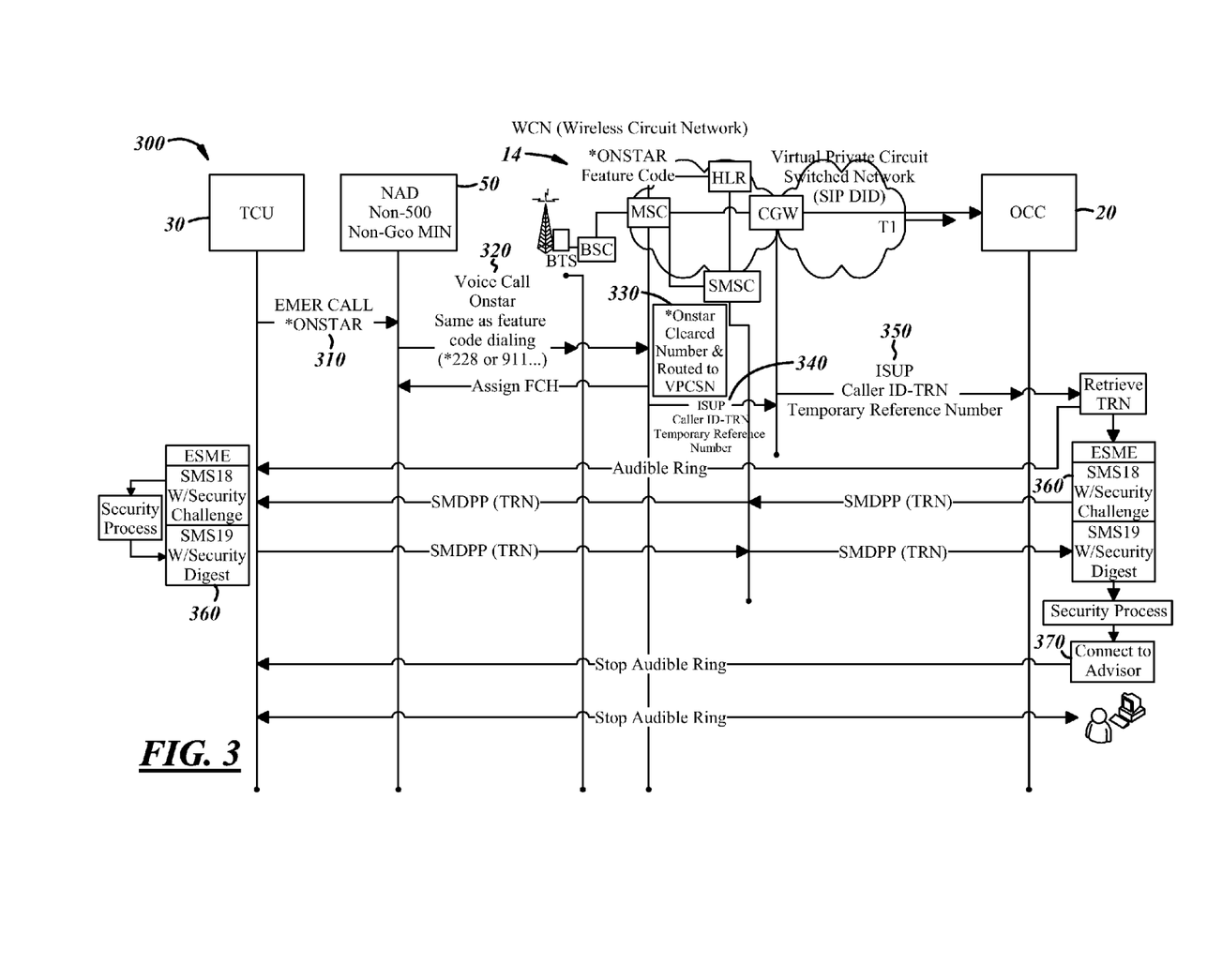
FIG. 3 is a flow chart depicting another exemplary embodiment of the method disclosed herein.

Turning now to FIG. 3, there is shown another embodiment of a method 300 of communicating between a vehicle and a telematics subscription service. The method 300 begins at step 310 by initiating a call using a vertical service code. In this embodiment, the vertical service code can be "*ONSTAR," which—when dialed by the vehicle telematics unit 30—can instruct the wireless carrier system 14 to direct a call from the vehicle telematics unit 30 to the call center 20. At step 320, the cellular chipset 50 of the vehicle telematics unit 30 can place a voice call to the call center 20 using the wireless carrier system 14 (also referred to as a wireless circuit network) and the vertical service code *ONSTAR. At step 330, the wireless carrier system 14 can recognize the vertical service code *ONSTAR and begin routing the call to the call center 20. In one example, the routing can be carried out at least partly using a virtual private network (VPN) that exists between the wireless carrier system 14 and the call center 20. The VPN in this example can be circuit-switched. At step 340, the wireless carrier system 14 can assign a temporary reference number to the call between the vehicle telematics unit 30 and the call center 20. As discussed above with respect to method 200, the temporary reference number can be the MIN/MDN or a random number generated by the wireless carrier system 14. Both the MIN/MDN and the random number can be passed between the wireless carrier system 14 and the call center using the VPN. At step 350, the temporary reference number can be transmitted to the call center 20 for communicating between the call center 20 and the vehicle telematics unit 30. This can include an ISDN user part (ISUP) instruction that can be used to transmit the temporary reference number from the wireless carrier system 14 to the call center 20.

The method 300 proceeds to step 360 in which the call center 20 can securely establish a call with the vehicle telematics unit 30. In this case, the call center 20 can include the temporary reference number as the payload of a short message service (SMS) message and transmit this message to the vehicle telematics unit 30. The SMS message can also include a security challenge, such as a request for a vehicle identifier (e.g. a MEID, a VIN, or subscriber account number), that identifies the vehicle. It is also possible that the SMS message includes a security challenge, such as a key challenge. The call center 20 can receive a response from the vehicle telematics unit 30 via another SMS message sent to the call center 20. When the call center 20 receives such a response, and the response includes an acceptable response to the security challenge, the method 300 proceeds to step 370 and the call between the call center 20 and the vehicle telematics unit 30 can be established. The method 300 then ends.

Figure 4:
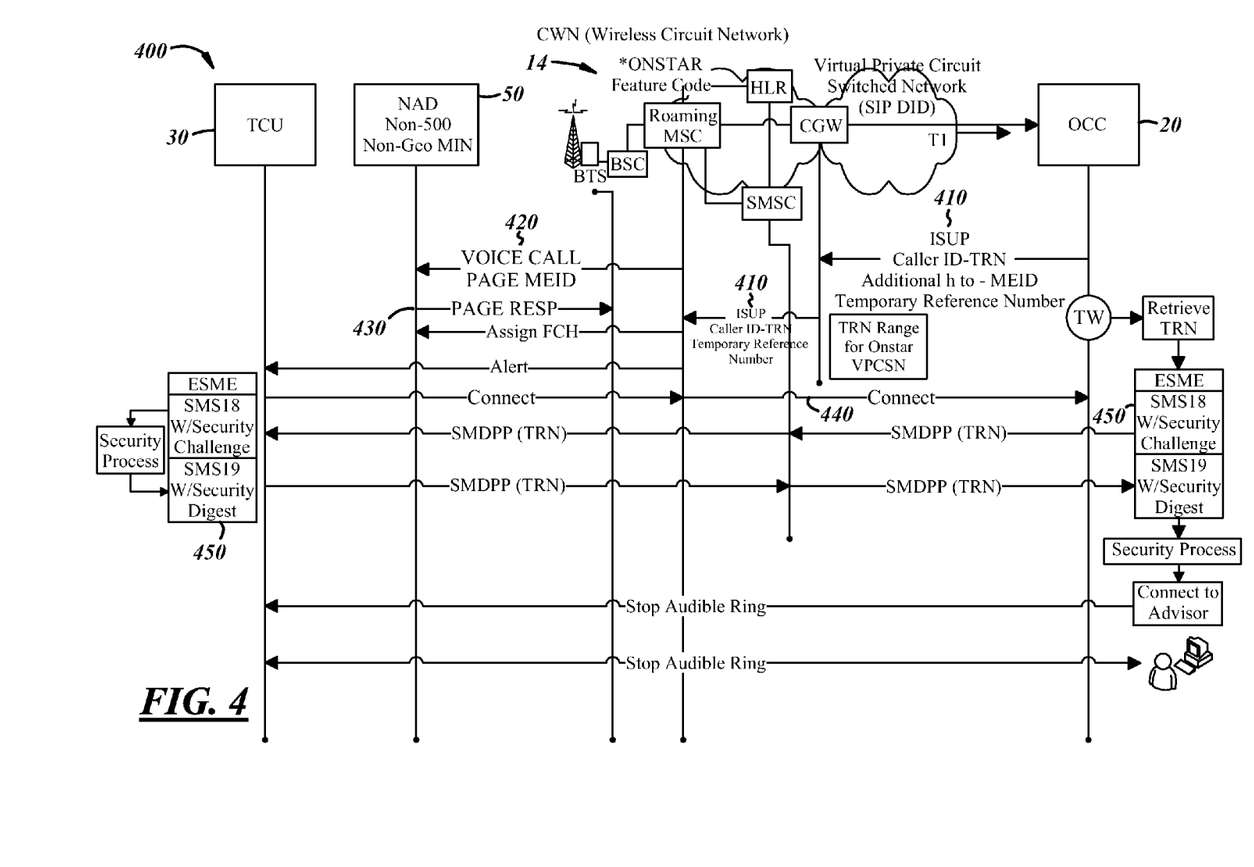
FIG. 4 is flow chart depicting yet another exemplary embodiment of the method disclosed herein.

Turning now to FIG. 4, there is shown yet another embodiment of a method 400 of communicating between a vehicle and a telematics subscription service. The method 400 begins at step 410 by wirelessly sending a temporary reference number and a mobile equipment identifier (MEID) of a vehicle telematics unit 30 from the call center 20 to the wireless carrier system 14. The call center 20 can request and obtain the temporary reference number from the wireless carrier system 14 for initiating a call to a particular vehicle 12 carrying the vehicle telematics unit 30. This request can be received by the wireless carrier system 14 over a dedicated communication channel that exists between the system 14 and the call center 20. In one embodiment, the dedicated communication channel can be a VPN that is established between the wireless carrier system 14 and the call center 20. To carry out the dedicated connection, session initiation protocol (SIP) signaling protocol can be used to control the communications between the wireless carrier system 14 and the call center 20.

Apart from the temporary reference number, the call center 20 can also identify and obtain the MEID of a particular vehicle telematics unit 30, which can be stored at the call center 20 using facilities such as servers 82 and/or databases 84. Once the temporary reference number and the MEID have been obtained, the method 400 proceeds to step 420 and the wireless carrier system 14 uses the MEID to page the vehicle telematics unit 30. In one example, this can involve a base station of the wireless carrier system 14, such as cell tower 70, paging the vehicle 12 having the vehicle telematics unit 30 that can be identified by the MEID. If the vehicle telematics unit 30 identified by the MEID is in communication with the base station, the method 400 proceeds to step 430 and the wireless carrier system 14 receives a response from the vehicle telematics unit 30. The method 400 then proceeds to step 440 and a call is established between the vehicle telematics unit 30 and the call center 20. At step 450, a security challenge can be sent from the call center 20 to the vehicle telematics unit 30. The security challenge can be sent as part of an SMS message that includes a key challenge for the vehicle telematics unit 30. The vehicle telematics unit 30 can respond with another SMS message that answers the key challenge. If the vehicle telematics unit 30 successfully answers the security challenge, the established call can be maintained, the vehicle telematics unit 30 can connect a vehicle occupant to a call advisor at the call center 20, and the method 400 ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating between a vehicle and a telematics subscription service, comprising the steps of:
   (a) initiating a call from a vehicle telematics unit to a telematics subscription service via a wireless carrier system;
   (b) accessing a vertical service code that is associated with the telematics subscription service and stored at a vehicle carrying the vehicle telematics unit;
   (c) establishing a call between the vehicle telematics unit and the telematics subscription service by dialing the accessed vertical service code, wherein the call is routed to the telematics subscription service based on an identity of the vertical service code, which is determined at the wireless carrier system; and
   (d) wirelessly transmitting vehicle-related data between the vehicle telematics unit and the telematics subscription service over the established call.

2. The method of claim 1, wherein the vertical service code further comprises an inter-network vertical service code.

3. The method of claim 1, wherein the vertical service code further comprises an intra-network vertical service code.

4. The method of claim 1, further comprising the step of associating a plurality of call centers of the telematics subscription service with the vertical service code.

5. The method of claim 1, wherein the telematics subscription service further comprises a call center.

6. The method of claim 1, further comprising the step of determining the identity of a call center that receives the established call based on the content of the vehicle-related data wirelessly transmitted between the vehicle telematics unit and the telematics subscription service.

7. The method of claim 1, wherein step (c) further comprises establishing the call using a temporary reference number.

8. The method of claim 7, further comprising the step of generating the temporary reference number using a random number generator.

9. The method of claim 7, further comprising the step of communicating temporary reference numbers using an ISDN user part (ISUP).

10. The method of claim 7, further comprising the step of communicating the temporary reference number between a wireless carrier system and the telematics subscription service via a virtual private network (VPN).

11. The method of claim 8, wherein the temporary reference number is quarantined for a period of time after use.

12. A method of communicating between a vehicle and a telematics subscription service, comprising the steps of:
   (a) providing a call center, associated with a telematics subscription service, which is capable of receiving wireless communications from a plurality of vehicles via a wireless carrier system;
   (b) establishing a vertical service code that is used by the wireless carrier system for receiving wireless communications from the plurality of vehicles, wherein the vertical service code is a particular string of digits recognized by the wireless carrier system as including an instruction directing communications to the call center;
   (c) receiving a call that is placed by dialing the vertical service code from one or more vehicles via the wireless carrier system;
   (d) identifying the received call using a temporary reference number randomly generated by the wireless carrier system; and
   (e) wirelessly communicating with one or more vehicles by sending vehicle-related data from the telematics subscription service or by receiving vehicle-related data at the telematics subscription service over the received call using the temporary reference number.

13. The method of claim 12, wherein the vertical service code further comprises an inter-network vertical service code.

14. The method of claim 12, wherein the vertical service code further comprises an intra-network vertical service code.

15. The method of claim 12, further comprising the step of communicating temporary reference numbers using an ISDN user part (ISUP).

16. The method of claim 12, further comprising the step of communicating the temporary reference number between the wireless carrier system and the call center via a virtual private network (VPN).

17. A method of communicating between a vehicle and a telematics subscription service, comprising the steps of:
   (a) initiating a call from a vehicle telematics unit to a telematics subscription service using a vertical service code, wherein the vertical service code is a particular string of digits recognized by the wireless carrier system as including an instruction directing communications to a call center;
   (b) determining the destination of the initiated call at a wireless carrier system based on the vertical service code;
   (c) assigning a temporary reference number to the initiated call at the wireless carrier system;
   (d) sending the temporary reference number to the call center in communication with the telematics subscription service;
   (e) establishing the call from the vehicle telematics unit to the call center based on the temporary reference number; and
   (f) communicating vehicle data between the vehicle telematics unit and the call center using the established call.

18. The method of claim 17, further comprising the step of generating the temporary reference number using a random number generator.

19. The method of claim 17, wherein the temporary reference number is sent to the call center via a virtual private network (VPN).

20. The method of claim 17, wherein the temporary reference number is quarantined for a period of time after use.

21. A method of communicating between a vehicle and a telematics subscription service, comprising the steps of:
   (a) receiving a temporary reference number generated by a wireless carrier system in response to determining that a vehicle telematics unit initiated a call using a vertical service code, wherein the vertical service code is a particular string of digits recognized by the wireless carrier system as including an instruction directing communications to the telematics subscription service;
   (b) sending a mobile equipment identifier (MEID) along with the received temporary reference number from a call center to the wireless carrier system;

(c) paging a vehicle telematics unit identified by the MEID using the sent MEID; and (d) after receiving a response to the MEID page at the wireless carrier system, establishing a call between the vehicle telematics unit and the call center using the temporary reference number.

\* \* \* \* \*